US 8,973,723 B2

(12) United States Patent
Chen et al.

(10) Patent No.: US 8,973,723 B2
(45) Date of Patent: Mar. 10, 2015

(54) BRAKE DISK ASSEMBLY

(71) Applicant: Song Jiing Accuracy Industry Company Limited, Fangyuan Township, Changhua County (TW)

(72) Inventors: Chung-Cheng Chen, Fangyuan Township, Changhua County (TW); Chung-Yi Chen, Fangyuan Township, Changhua County (TW); Sheng-Chien Li, Fangyuan Township, Changhua County (TW); Yu-Ren Chen, Fangyuan Township, Changhua County (TW)

(73) Assignee: Song Jing Accuracy Industry Company Limited, Fangyuan Township, Changhua County (TW)

( * ) Notice: Subject to any disclaimer, the term of this patent is extended or adjusted under 35 U.S.C. 154(b) by 0 days.

(21) Appl. No.: 13/904,324

(22) Filed: May 29, 2013

(65) Prior Publication Data

US 2014/0116822 A1 May 1, 2014

(30) Foreign Application Priority Data

Oct. 31, 2012 (TW) .............................. 101140436 A

(51) Int. Cl.
*F16D 65/12* (2006.01)
*F16D 65/02* (2006.01)

(52) U.S. Cl.
CPC .............. *F16D 65/128* (2013.01); *F16D 65/12* (2013.01); *F16D 2065/132* (2013.01); *F16D 2065/1328* (2013.01); *F16D 2065/1344* (2013.01); *F16D 2065/1392* (2013.01)
USPC .................................................... 188/218 XL

(58) Field of Classification Search
USPC ............................ 188/218 XL, 264 R, 264 A
See application file for complete search history.

(56) References Cited

U.S. PATENT DOCUMENTS

| 4,164,993 | A | * | 8/1979 | Kobelt ................... 188/218 XL |
| 5,224,572 | A | | 7/1993 | Smolen, Jr. et al. |
| 2007/0181390 | A1 | * | 8/2007 | Korm ...................... 188/218 XL |
| 2013/0087420 | A1 | * | 4/2013 | Fraley et al. ............ 188/218 XL |
| 2013/0133994 | A1 | * | 5/2013 | Iwai et al. ............... 188/218 XL |
| 2013/0180806 | A1 | * | 7/2013 | Iwai et al. ........................ 188/26 |

FOREIGN PATENT DOCUMENTS

TW I274818 3/2007

* cited by examiner

*Primary Examiner* — Vishal Sahni
(74) *Attorney, Agent, or Firm* — Muncy, Geissler, Olds & Lowe, P.C.

(57) ABSTRACT

A dual-structure brake disk assembly includes a first disk, a second disk and a hollow area located between the first and second disks. The brake disk has high strength, high efficiency for dissipating heat and lightweight. The brake disk is manufactured quickly and has high production efficiency.

6 Claims, 8 Drawing Sheets

A-A

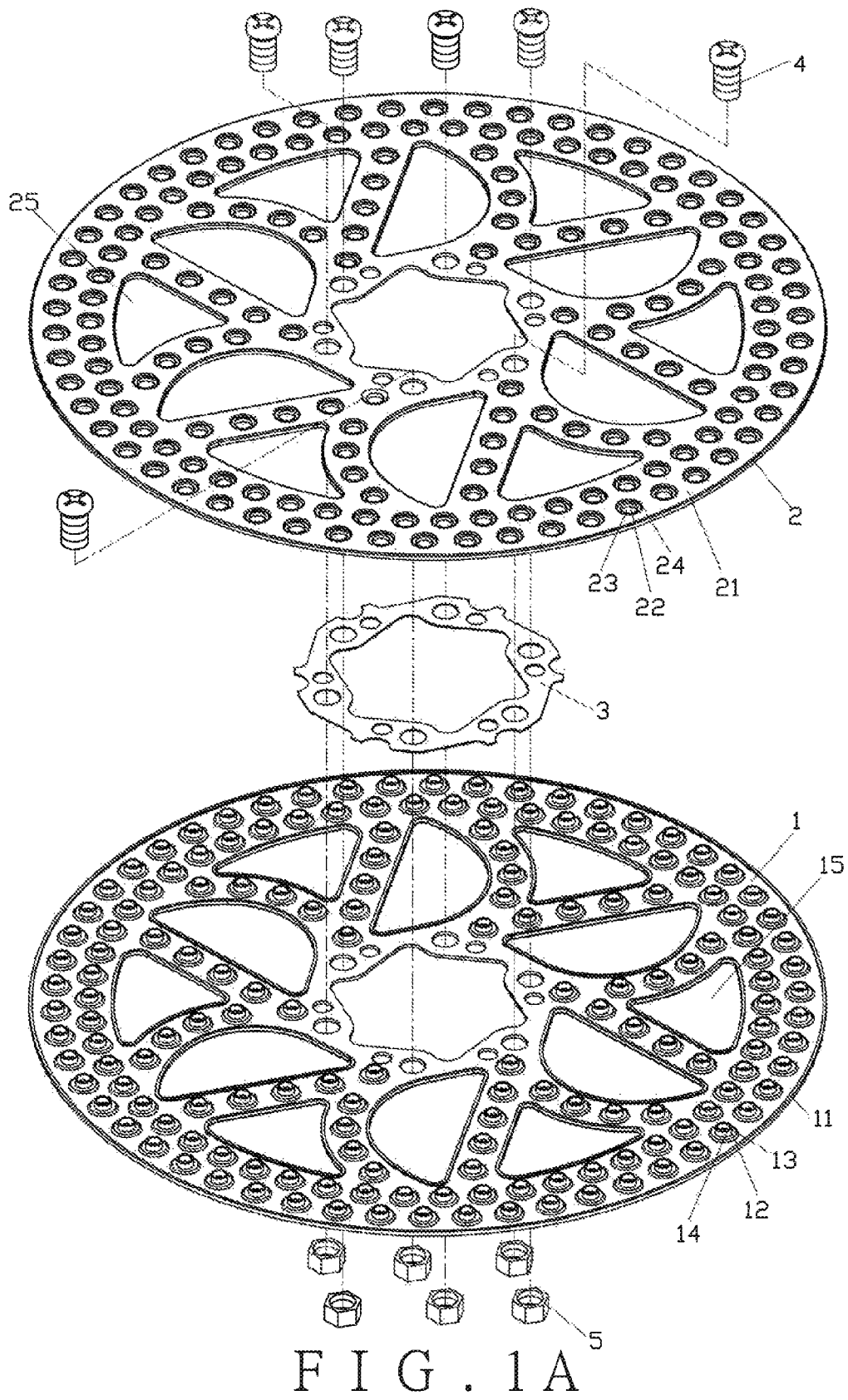
F I G. 1A

BRAKE DISK ASSEMBLY

FIELD OF THE INVENTION

The present invention relates to a brake disk assembly, and more particularly, to a lightweight dual-structure brake disk assembly with multiple holes defined therethrough, connectors are connected between the holes to form cooling paths. The brake disk assembly is made by way of pressing/stamping/impact molding.

BACKGROUND OF THE INVENTION

The conventional braking method is to clamp the brake disk by two lining plates, and the friction between the brake disk and the lining plates transfers the kinetic energy into heat to stop the vehicle.

It is noted that the brake disk is applied by high friction so that it is required to have sufficient strength. The brake disk has to bear higher temperature when transferring the kinetic energy into heat. The abilities to bear high temperature and structural strength are basic features for a brake disk.

TW Patent No. I274818 discloses multiple fins formed on the inner and outer peripheries of the brake disk and at least one pair of the fins have multiple paths defined therebetween. Each path has a first opening and a second opening, wherein the entrance is located at the central portion of the path and the outlet is located at the periphery of the disk. By the openings, the efficiency for bringing heat away from the brake disk is increased. U.S. Pat. No. 5,224,572 discloses a "Lightweight Brake Rotor with a Thin, Heat Resistant Ceramic Coating" wherein the brake rotor has a plurality of circumferentially spaced radially spaced cooling apertures so as to increase the efficiency for bringing heat away from the brake disk.

The present invention intends to provide a dual-structure brake disk with high strength and high efficiency for bringing heat away from the brake disk.

SUMMARY OF THE INVENTION

The present invention relates to a brake disk assembly and comprises a first disk and a second disk, wherein the first disk has multiple first holes defied therethrough and the second disk has multiple second holes defined therethrough. The first holes are located corresponding to the second holes. A separation member is located between the first and second disks. Preferably, the separation member comprises multiple protrusions pressing from the first and second disks. A hollow area is defined between the first and second disks. The first and second disks each have a friction face formed on outside thereof. Multiple connectors are connected between the first and second disks and located corresponding to the first and second holes so as to define a cooling path between the first and second holes. The connectors do not extend beyond the first and second friction faces.

The primary object of the present invention is to provide a brake disk assembly which has connectors connected between the respective holes of the first and second disk to form multiple cooling paths such that the connection strength and the heat dissipating efficiency are increased. The cooling paths also reduce the weight of the brake disk assembly.

Another object of the present invention is to provide a brake disk assembly which is easily manufactured by way of pressing. Preferably, the first and second disks are connected to each other by one time pressing such that the production rate of the brake disk assembly is fast.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1A is an exploded view to show the brake disk assembly of the present invention;

DETAILED DESCRIPTION OF THE PREFERRED EMBODIMENT

Figure 1B:
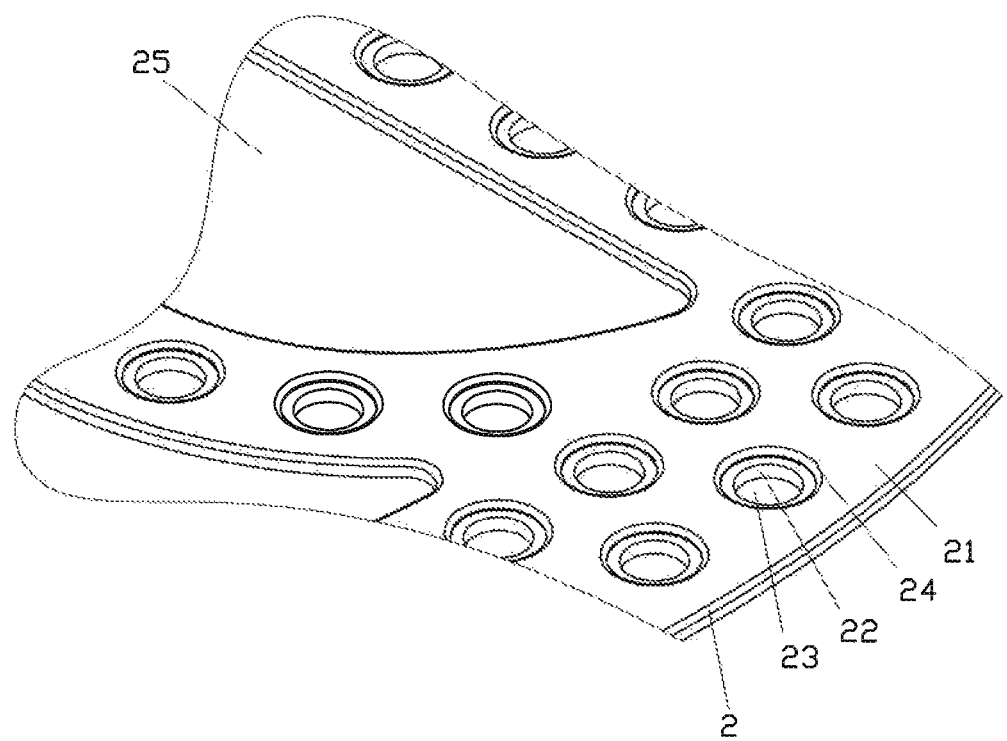
FIG. 1B shows the enlarged view of the second disk of the brake disk assembly of the present invention.
Figure 1C:
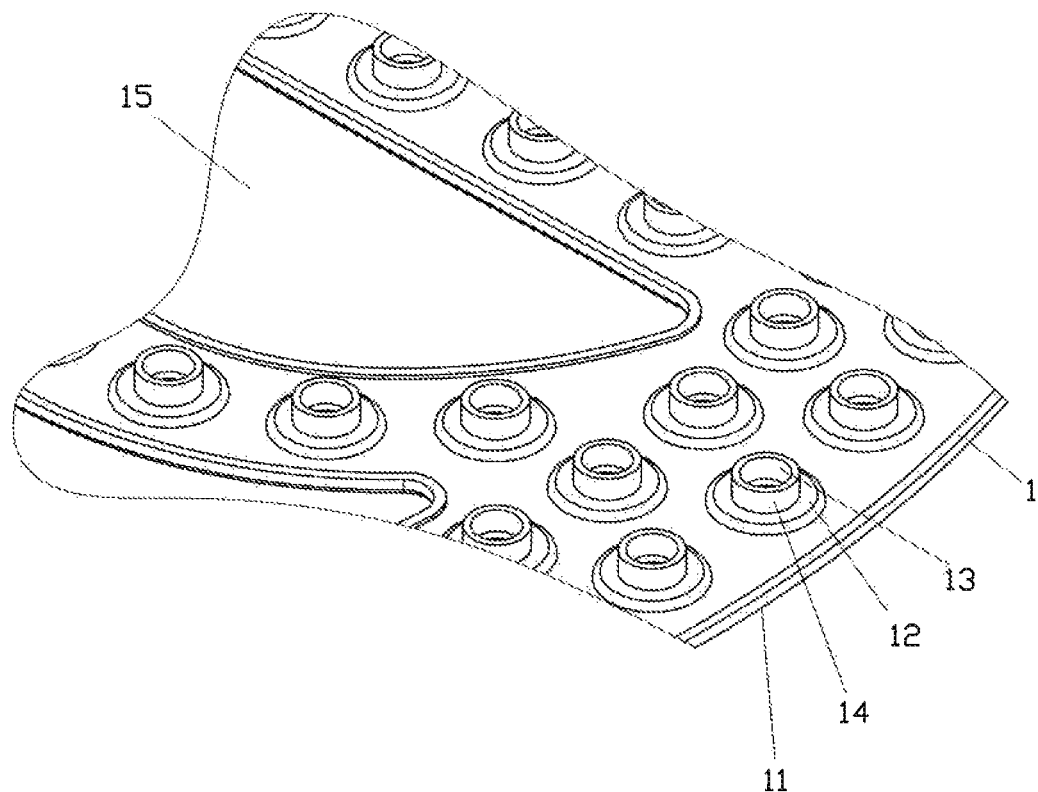
FIG. 1C shows the enlarged view of the first disk of the brake disk assembly of the present invention.

Referring to FIGS. 1A to 1C, the brake disk assembly of the present invention comprises a first disk 1 and a second disk 2. The first disk 1 has a first friction face 11. Multiple first protrusions 12, multiple first holes 13 and multiple connectors 14 are pressed from the first friction face 11. The first holes 13 are defined in the first protrusions 12. The connectors 14 are connected to the first protrusions 12 and located along the periphery of the first holes 13. The connectors 14 are tubular members. Multiple first apertures 15 are defined through the first disk 1 by way of pressing. The second disk 2 has a second friction face 21. Multiple second protrusions 22, multiple second holes 23 are pressed from the second friction face 21. The second holes 23 are defined in the second protrusions 22. The second friction face 21 has multiple recessed areas 24 formed therein at the positions where the second protrusions 22 are located. Multiple second apertures 25 are defined through the second disk 2 by way of pressing.

Figure 2:
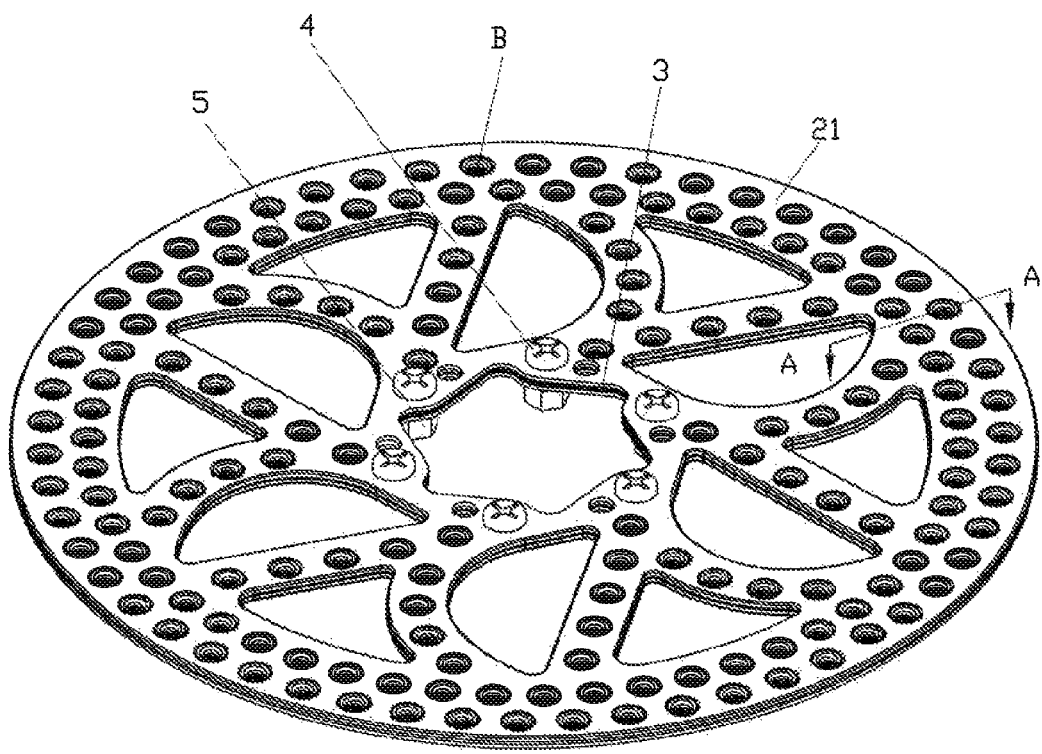
FIG. 2 is a perspective view to show the brake disk assembly of the present invention.
Figure 3:
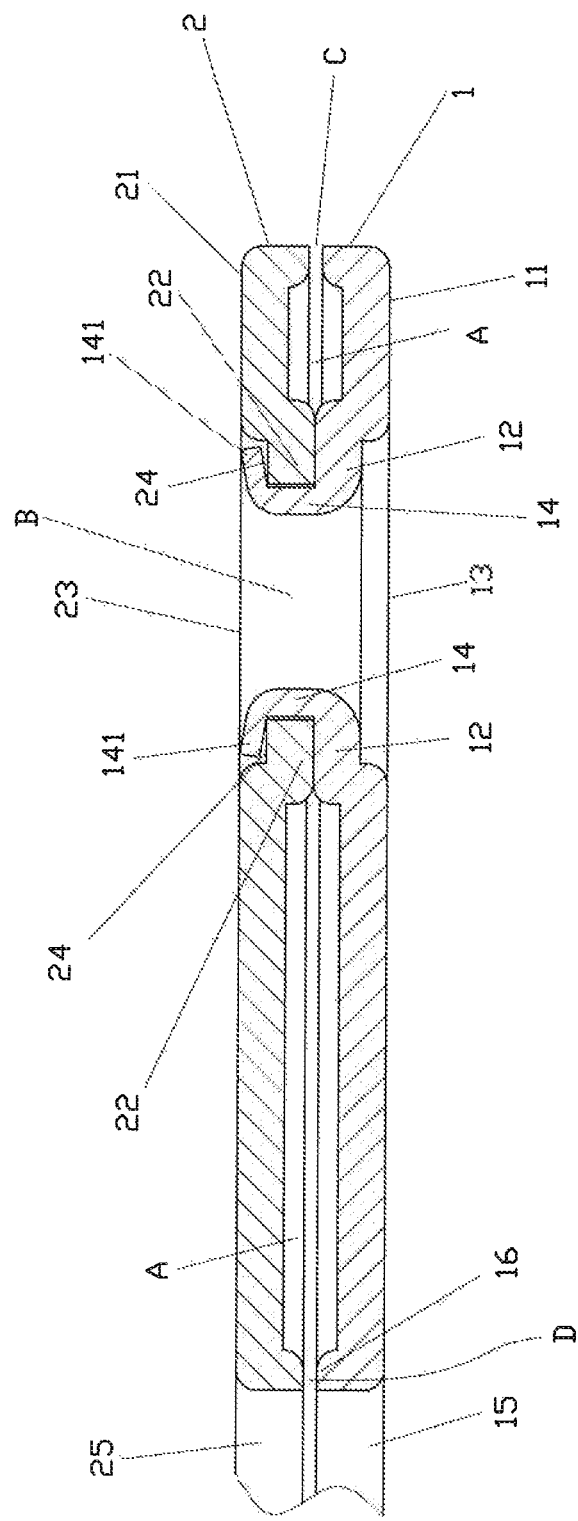
FIG. 3 is a cross sectional view, taken along line A-A of FIG. 2.

As shown in FIGS. 2 and 3, the first protrusions 12 of the first disk 1 contact the second protrusions 22 of the second disk 2 so as to define a hollow area "A" between the first and second disks 1, 2. The connectors 14 extend through the second holes 23 of the second disk 2 and beyond the second friction face 21. The distal end of each connector 14 extending beyond the second friction face 21 is bent to form a bent portion 141 which contacts the recessed area 24 of the second disk 2. Therefore the first and second disks 1, 2 are connected to each other and multiple cooling paths "B" are formed between the first and second holes 13, 23. After the bent portions 141 are forming, the connectors 14 do not extend beyond the first and second friction faces 11, 21. When the first and second disks 1, 2 are connected to each other, a first gap C is formed between the first and second disks 1, 2 and located along the periphery of the first and second disk 1, 2. The first gap "C" communicates with the hollow area "A". The first apertures 15 are located corresponding to the second apertures 25. A second gap "D" is formed between the first and second disks 1, 2 and located along the periphery of the first and second apertures 15, 25. The second gap "D" communicates with the hollow area "A". The first gap "C", the second gap "D" and the hollow area "A" form a heat convection path. It is noted that the heat convection path is not limited as the above-mentioned configuration and can be obtained by any possible way as long as the hollow area "A" communicates with outside of the brake disk assembly. For example, the convection path can be obtained by drilling holes in the first and second disks 1, 2.

By the connectors 14 connected between the first and second holes 13, 23 of the first and second disks 1, 2, the first and second disk 1, 2 are securely connected to each other and hence formed multiple connecting points therebetween, so that the connection between the first and second disks 1, 2 has excellent strength. Consequently, the first and second disks 1, 2 can bear great friction force and high temperature, generated from braking in a high speed, without great deformation and damages. The heat convection paths are formed by the first gap "C", the second gap "D" and the hollow area "A", so that the heat generated between the first and second friction faces 11, 21 and the lining plates can be quickly brought away by the heat convection phenomena of the heat convection paths. The cooling paths "B" between the first and second holes 13, 23 can boost the heat convection phenomena so as to increase the heat dissipating efficiency. The first apertures 15 of the first disk 1 and the second apertures 25 of the second disk 2 reduce the weight of the brake disk assembly.

The first and second disks 1, 2 are connected to each other by way of pressing can be quickly manufactured. Preferably, after the first and second disks 1, 2 are made, the first and second disks 1, 2 are connected to each other by one time pressing. As shown in FIG. 1, before the first and second disks 1, 2 are connected to each other, a washer 3 is located between two respective central portions of the first and second disks 1, 2. Multiple bolts 4 are used to extend through the first disk 1, the washer 3 and the second disk 2, and connected with nuts 5 to increase the connection between the first and second disks 1, 2.

Figure 4:
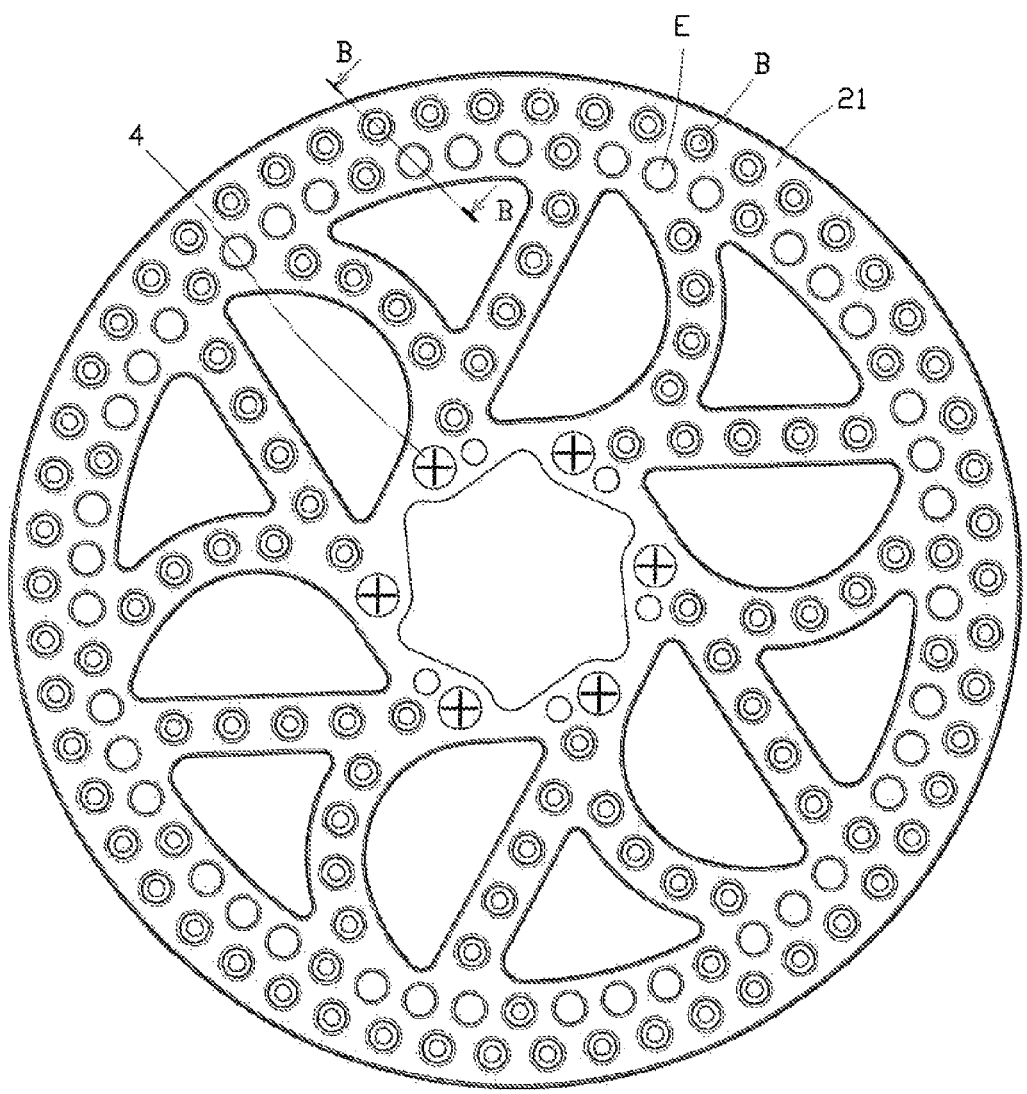
FIG. 4 shows the second embodiment of the brake disk assembly of the present invention.
Figure 5:
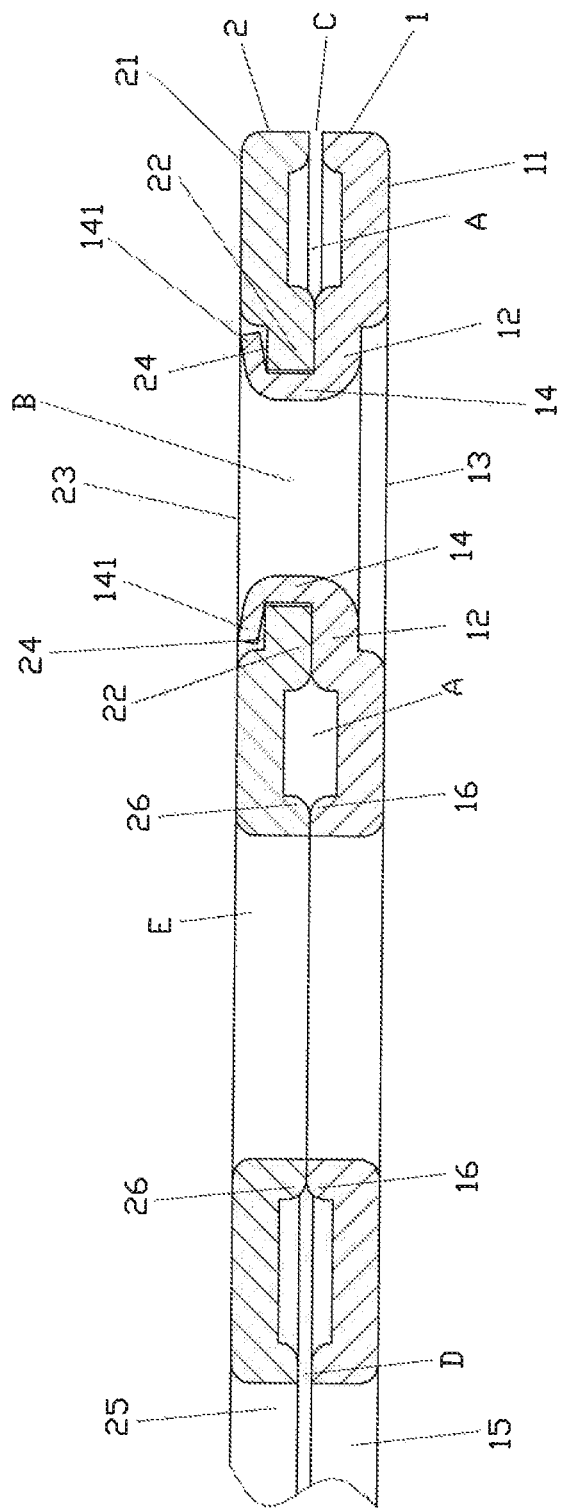
FIG. 5 is a cross sectional view, taken along line BB of FIG. 4.

FIGS. 4 and 5 show the second embodiment of the present invention, wherein the first disk 1 has some of the first holes 13 defined in the first protrusions 12. The connectors 14 are connected to the first protrusions 12 and located along the periphery of the first holes 13. The second disk 2 has some of the second holes 23 defined in the second protrusions 22. Some of the first holes 13 are pressed to form the third protrusions 16, and some of the second holes 23 are pressed to form the fourth protrusions 26. When the first and second disks 1, 2 are connected to each other, the third protrusions 16 contact the fourth protrusions 26. A cooling path "E" is formed between the first and second holes 13, 23. This embodiment is suitable used to bicycles or motorbikes which are operated at lower speed.

Figure 6:
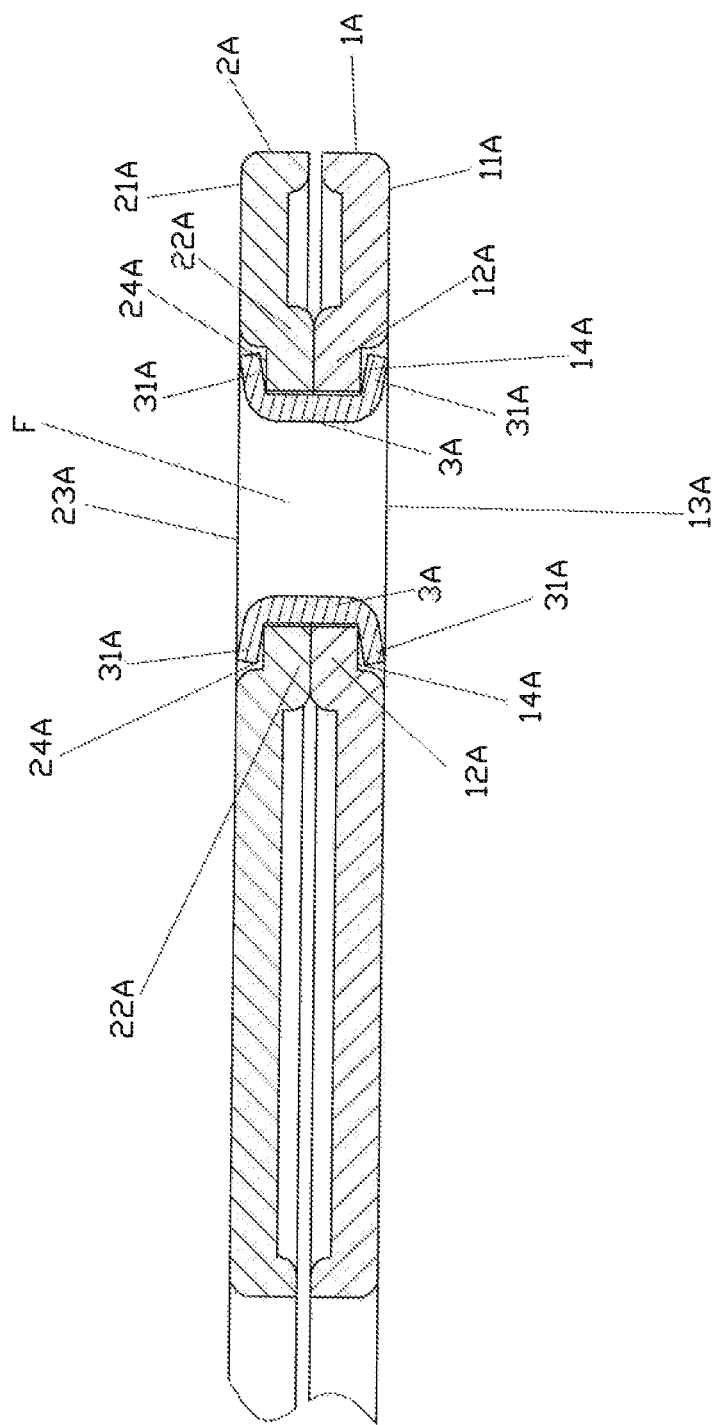
FIG. 6 shows the third embodiment of the brake disk assembly of the present invention.

FIG. 6 shows the third embodiment of the present invention, and the third embodiment has a first disk 1A and a second disk 2A. The first disk 1A has a first friction face 11A. Multiple first protrusions 12A and multiple first holes 13A are pressed from the first friction face 11A. The first friction face 11A has multiple first recessed areas 14A formed therein which are located at the positions where the first protrusions 12A are located. The second disk 2A has a second friction face 21A. Multiple second protrusions 22A and multiple second holes 23A are pressed from the second friction face 21A. The second friction face 21A has multiple second recessed areas 24A formed therein which are located at the positions where the second protrusions 22A are located. The first and second protrusions 12A, 22A are in contact with each other when the first and second disks 1A, 2A are connected to each other. A distance is formed between the first and second disks 1A, 2A. The connectors 3A are tubular members and extend through the first holes 13A of the first disk 1A and the second holes 23A of the second disk 2A. Two distal ends of each of the connectors 3A are bent to form two bent portions 31A which contact the first and second recessed areas 14A, 24A of the first and second disks 1A, 2A so as to connect the first and second disks 1A, 2A. A cooling path "F" is formed between the first and second holes 13A, 23A. Therefore, the configuration/arrangement of the third embodiment can achieve the same effects as that of the first embodiment.

While we have shown and described the embodiment in accordance with the present invention, it should be clear to those skilled in the art that further embodiments may be made without departing from the scope of the present invention.

What is claimed is:

1. A brake disk assembly comprising:
a first disk having multiple first holes defined therethrough,
a second disk having multiple second holes defined therethrough, first holes located corresponding to the second holes,
a separation member located between the first and second disks, and
a hollow area defined between the first and second disks, the hollow area communicating with an external space of the brake disk assembly through at least one gap between the first and second disks to form a heat convection path,
wherein the first and second disks each have a friction face formed on an outside thereof,
wherein multiple connectors are connected between the first and second disks and located corresponding to the first and second holes so as to define a cooling path penetrating through the first and second holes,
wherein the connectors do not extend beyond the first and second friction faces; and
wherein the connectors are formed on the first disk by way of pressing, the connectors are connected to first protrusions extending from the first disk and located around the first holes, a distal end of each connector is bent to form a bent portion which contacts the recessed area of the second disk.

2. The brake disk assembly as claimed in claim 1, wherein the separation member is multiple protrusions respectively extending from the first and second disks by way of pressing, the first and second holes are formed by way of pressing, the first and second holes are defined through the protrusions, the protrusions contact with each other to separate the first and second disks, the first and second friction faces each have multiple recessed areas located corresponding to the protrusions.

3. The brake disk assembly as claimed in claim 2, wherein the connectors are tubular members and extend through the first holes of the first disk and the second holes of the second disk, two distal ends of each of the connectors are bent to form two bent portions which contact the recessed areas of the first and second disks.

4. The brake disk assembly as claimed in claim 1, wherein at least one of the first and second disks has more than one aperture, more than one gap is formed between the first and second disks and located along a periphery of the more than one aperture, the more than one gap communicates with the hollow area.

5. The brake disk assembly as claimed in claim 1, wherein the connectors are connected between some of the first and second holes of the first and second disks.

6. The brake disk assembly as claimed in claim 1, wherein a washer is located between two respective central portions of the first and second disks.

* * * * *